April 15, 1958     A. J. BRAME     2,830,480
SPANNER WRENCH FOR TUBING UNIONS
Filed June 23, 1955
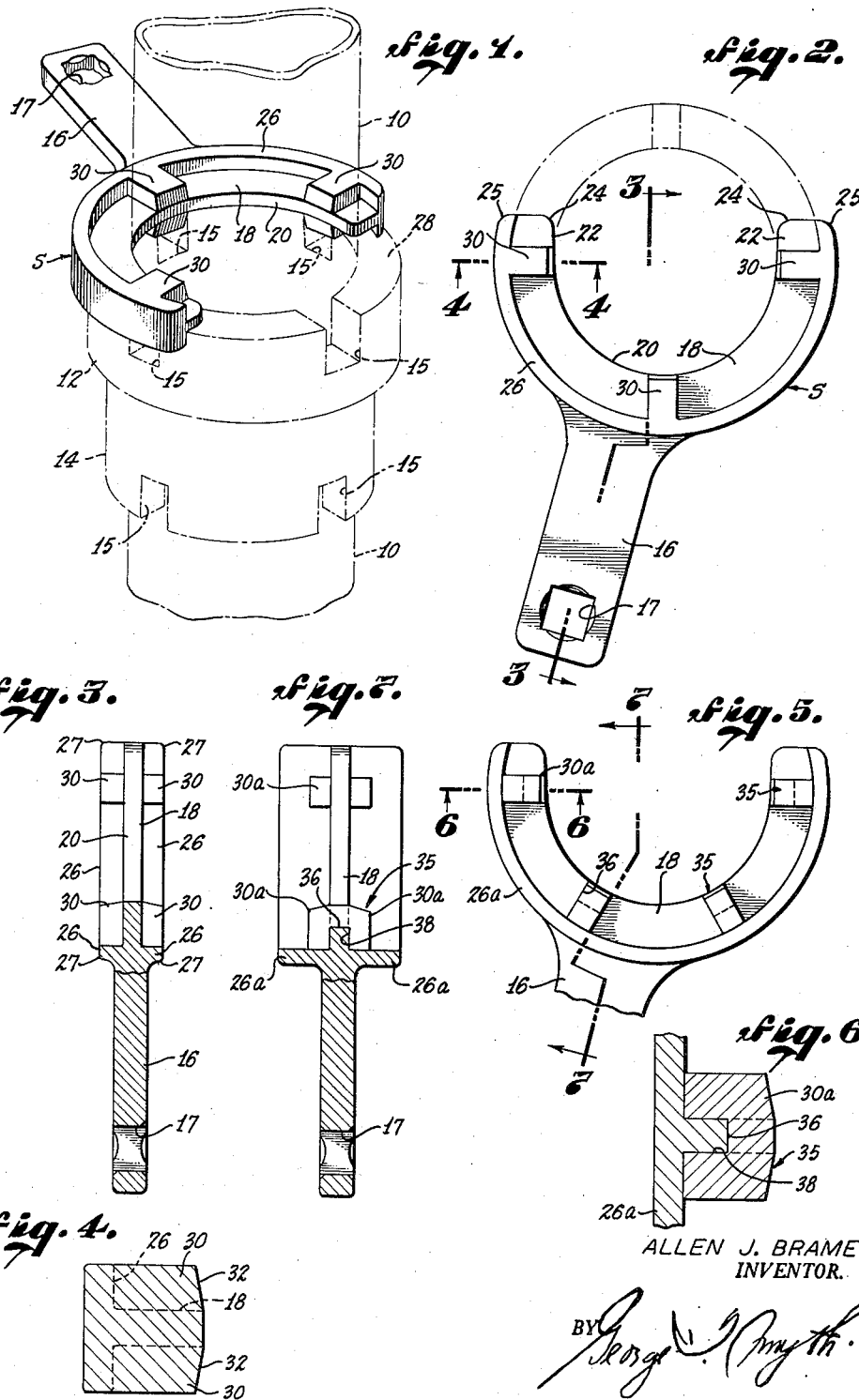
ALLEN J. BRAME,
INVENTOR.
BY *George W. Smyth*
ATTORNEY.

United States Patent Office 2,830,480
Patented Apr. 15, 1958

2,830,480

SPANNER WRENCH FOR TUBING UNIONS

Allen J. Brame, Los Angeles, Calif., assignor, by mesne assignments, to The Plomb Tool Company, Los Angeles, Calif., a corporation Application June 23, 1955, Serial No. 517,560

3 Claims. (Cl. 81—90)

This invention relates to spanner type wrenches for use with tubing fittings or the like and is directed to a novel spanner member that is not only highly efficient for the application of torque to tube unions and the like but is also of a construction that inherently minimizes the likelihood of the spanner member damaging tubing and tube fittings to which it may be applied. The spanner member is operatively connected to means by which it may be actuated for the application of torque to tube fittings. The actuating means may be a handle rigidly united with the spanner member or may comprise separate actuating structure for rotating the spanner member by a pawl and ratchet mechanism as set forth, for example, in the Brame Patent 2,691,316.

Spanner wrenches of the type to which the invention pertains are employed to apply torque to a union assembly or like fitting at the end of a length of tubing to effect a fluid-tight tubing joint. The particular element of the union assembly to which the spanner is applied is a sleeve or cylinder element having circumferentially spaced notches in one of its ends for engagement by the spanner wrench. In the application of such a wrench for its purpose, it has been a troublesome problem to avoid damaging the tubing and fittings especially on aircraft where numerous tubing fittings may be closely grouped together in a confined space. In some instances, the peripheral surface of the tubing is exposed at the recessed end of the union element and it is only too easy for the spanner lugs to score the tubing so deeply as to require complete replacement of the tubing. In other instances, a peripheral surface of an element of the union assembly itself is exposed near the recessed union element, which surface is a anodised or otherwise treated for corrosion resistance and inadvertent scoring of this surface destroys the required protection against corrosion.

Damage by the spanner member may occur in the initial application of the spanner wrench to the union assembly or during the torque-applying operation of the wrench, or during the withdrawal of the wrench from the union assembly. In the initial application of the wrench, the gap of the typical spanner wrench is advanced towards the tubing to a position straddling the tubing and great care must be exercised in this maneuver to keep the spanner lugs from gouging the vulnerable surfaces. During the torque-applying operation in which the spanner rotates relative to underlying vulnerable surfaces, care must be taken to keep the spanner lugs from shifting radially inward into scoring contact with the vulnerable surfaces. Finally in withdrawing the wrench from the union assembly after torque-applying operation, care is required to keep the laterally moving spanner member from digging into the exposed vulnerable surfaces.

The present invention has numerous features which work together to minimize such damage at each of these three stages in the application of the spanner to a union assembly or like tubing fitting. One of these features is the use of circumferential flanges to serve as guides or guards, there being a radially inward flange and at least one outer cylindrically curved flange unitary therewith. The two flanges form a circumferential recess of the configuration of a right angle in radial cross-section and the spanner member has a plurality of lugs seated in this recess and united with both of the flanges. The spanner conforms to the configuration of an incomplete circle with a gap in the circle as wide as the diameter of the tubing to permit the spanner member to be advanced to a position straddling the tubing and then to be moved longitudinally along the tubing into effective engagement with the recesses of the union assembly. The radial flange extends radially inward from the cylindrically curved flange at least as far as the spanner lugs and preferably the cylindrical flange extends axially away from the radial flange at least as far as the spanner lugs.

When the spanner member is initially advanced into a position straddling the tube, the inner radial flange serves as a guide to hold the spanner member to an approach path that prevents damaging contact of the lugs with the periphery of the tubing. During the torque-applying operation the cylindrical flange embraces the outer circumferential surface of the recessed union element to keep the spanner lugs spaced radially outward from any vulnerable surfaces of the tubing or of the union assembly in the region of the spanner recesses of the union assembly. In the subsequent withdrawal of the wrench from the tubing, the inner radial rib again serves as a guide to avoid damaging contact of the spanner lugs with the adjacent vulnerable surfaces of the tubing.

Another feature of the preferred practice of the invention is the provision of at least three spanner lugs with two of the lugs spaced 180° apart. The third lug cooperates with the corresponding spanner recess of the union to keep either of the two diametrical lugs from moving radially inward into contact with the adjacent vulnerable surfaces during the torquing operation.

Still another feature of the preferred practice of the invention is the concept of tapering the spanner lugs, the inner surfaces of the lugs tapering radially outward from the inner radial flange of the spanner member. In the presently preferred practice of the invention, the taper is of the order of magnitude of 10° relative to the axis of the spanner member. This taper of the inner surfaces of the lugs permits the spanner member to be canted laterally to a substantial angle without bringing the corners of the lugs into damaging contact with the vulnerable surfaces of the union assembly or vulnerable surfaces of the tubing adjacent the union assembly.

A feature of one of the practices of the invention is the extension of the cylindrically curved flange of the spanner member axially beyond the spanner lugs. The exceptionally wide cylindrically curved flange not only serves as an effective guard for the axial ends of the spanner lugs but also increases the extent to which the spanner member telescopes over the end of the recessed union element in the torque-applying operation of the wrench. Such extended overlapping not only increases the operating stability of the spanner member, but also further increases the effectiveness of the cylindrically curved flange for maintaining the spanner lugs out of contact with the adjacent vulnerable surfaces.

A still further feature of the invention is the concept of minimizing the weight of the spanner member to minimize the force of any accidental impacts against vulnerable surfaces on the part of the spanner member. Fortuitously, the provision of unified radial and cylindrical flanges inherently provides a structural configuration which may be made of thin-walled construction for high structural strength in proportion to weight. It is advantageous in this respect to use alloy steels to attain the desired strength with thin walls. A special advantage of using a hard alloy steel is that such hard metal is not easily dented or otherwise deformed to create sharp edges such as might damage the vulnerable surfaces of tubing and fittings.

The invention also includes a method of manufacturing such a spanner member that is highly advantageous, not only with respect to manufacturing economy but also with respect to the structural efficiency of the finished spanner member. This method consists essentially in notching the radially inward flange of the spanner member and mounting notched bodies in these flange notches in positive interlocking relation with the flange to provide the spanner lugs.

The various features and advantages of the invention may be understood from the following detailed description considered with the accompanying drawing.

In the drawing, which is to be regarded as merely illustrative:

Figure 1 is a perspective view of one embodiment of the invention in engagement with a tubing union assembly, the tubing union assembly and the associated tubing being shown in phantom;

Figure 2 is a plan view of the same embodiment of the invention;

Figure 3 is a section of Figure 2 taken as indicated by the angular line 3—3;

Figure 4 is a radial section taken as indicated by the line 4—4 of Figure 2 showing the cross-sectional configuration of the spanner member at a pair of oppositely facing lugs thereof;

Figure 5 is a fragmentary plan view of a second embodiment of the invention;

Figure 6 is a radial section taken as indicated by the line 6—6 of Figure 5 showing how a notched body is mounted in a notch of the radial flange to provide a pair of the spanner lugs; and Figure 7 is a section of the second embodiment of the invention taken as indicated by the angular line 7—7 of Figure 5.

Figure 1 shows a well known type of union assembly for interconnecting the adjacent ends of two pieces of tubing 10. The union assembly includes two cylindrical union elements 12 and 14 of different diameters in screw threaded engagement with each other and further includes other concealed elements. Each of these cylindrical union elements 12 and 14 has a set of circumferentially spaced spanner recesses 16 in its outer end for engagement by a spanner wrench. In this instance, there are two diametrical pairs of spanner recesses 15 approximately 90° apart.

Figure 1 shows a spanner member, generally designated by the letter S, which embodies the present invention and is dimensioned and adapted for applying torque to the union element 12. The spanner member S is operatively connected to suitable means for actuation thereof and in this instance such means comprises a handle 16 that is unitary with the spanner member. The handle 16 is formed with a square aperture or socket 17 to permit a suitable handle extension (not shown) to be operatively engaged with the handle in a well known manner to increase the effective length of the handle for high leverage in the application of torque.

As may be seen in Figure 2, the spanner member S has the general configuration of an incomplete circle with a gap slightly wider than the diameter of the tubing 10 to permit the spanner member to be moved into position straddling the tubing. The spanner member is then moved laterally against the recessed end of the union element 12 for the application of torque thereto.

The spanner member S has a radial web or inwardly directed radial flange 18, the inner edge of which defines the previously mentioned gap. This inner edge 20 substantially conforms to a semicircle with extensions at each end of the semicircle. In this instance, the semicircular inner edge 20 is circular for 180° and has two opposite tangential extensions 22. It is to be noted that both of the ends of the spanner member S on opposite sides of the gap are formed with rounded edges, there being a pair of inner rounded edges 24 and a pair of outer rounded edges 25, as the spanner member is viewed in Figure 2. It will be noted that the divergent inner edges of the extensions 22 provide on the wrench a mouth which is substantially wider than the diameter of the tubing 10. Positioning of the spanner member on the union element is thereby greatly facilitated.

The spanner member S has at least one cylindrically curved flange 26 extending axially from the inner radial flange 18. In this embodiment of the invention there are two such cylindrical flanges extending in opposite axial directions from the radial rib 18, the two forming a continuous cylindrical wall and being integral with the inner radial flange 18. It is to be noted that the outer end edges of the cylindrically curved flanges 26 are rounded as indicated at 27 in Figure 3. These cylindrically curved flanges 26 have an inside diameter dimensioned to enable either flange to embrace or telescope over the recessed end of the union element 12 in the manner shown in Figure 1 to place the inner radial flange 18 in abutment against the end face 28 of the union element 12.

The spanner member S has two alternate sets of lugs 30 spaced circumferentially to engage the recesses 15 of the union element 12. In this embodiment of the invention, there are two diametrically opposite lugs at the ends of the semicircle defined by the inner edge 20 of the radial flange 18 and a third lug at an intermediate position 90° from each of the two diametrical lugs. Each of these lugs is united both with the inner radial flange 18 and with the corresponding cylindrically curved flange 26, the lugs being positioned in the circumferential recess formed by the two flanges. The circumferentially spaced lugs 30 of each of the two sets of lugs are paired and extend in opposite directions from the inner radial flange 18. The lugs 30 of each set are interconnected not only by the inner radial flange 18 but also by one of the cylindrically curved flanges 26. It is apparent that the inner flange 20 acts in tension to resist any forces that tend to increase the circumferential spacing of the lugs 30.

It is important to note that the radial flange 18 extends radially inwardly away from the cylindrically curved flanges 26 at least as far as the lugs 30. Preferably each of the cylindrically curved flanges 26 extends axially away from the inner radial flange 18 at least as far as the lugs 30. In other words, the lugs 30 preferably neither extend radially inward beyond the radial flange 18 nor extend axially beyond the circumferentially curved flanges 26.

In the preferred practice of the invention, the lugs 30 are tapered in both directions from the inner radial flange 18 as shown in Figures 1 and 2. Preferably the inclination of the taper is on the order of 10° relative to the axis of the spanner member. Thus as best shown in Figure 4, each of the pairs of lugs 30 has an inner inclined face 32 extending axially away from the inner radial rib 18.

The manner in which this first embodiment serves its purpose may be readily understood from the foregoing description. It is apparent that the configuration of the spanner member S is symmetrical with reference to the inner radial flange 18 and that therefore either side of the spanner member may be applied to the recessed union member 12 for engagement therewith. Due to the angular offset of the handle 16, the wrench may be used in confined spaces by first turning the union element through the distance permitted by the confined space, then turning the wrench over and engaging the other set of spanner lugs in the spanner recesses of the union element and again rotating the union element the limited distance.

When the spanner member S is moved initially into position to straddle the tubing 10 in preparation for engagement with the union element 12, the U-shaped inner radial flange 18 serves as guide means for cooperating contact with the tubing 10 to keep the edges of the spanner lugs 30 from making damaging contact with the peripheral surface of the tubing. The lugs on the upper side of the radial flange serve to indicate the locations of the lugs on the under side of the radial flange so as to facilitate alining of the latter lugs and spanner recesses 15. As the spanner member is then moved laterally into engagement with the recesses 15 of the union element 12, the U-shaped radially inward flange 18 continues to serve as a guide or guard to keep the lugs 30 from scoring or gouging the surfaces of the tubing 10. The tapering of the lugs 30 is highly important since it permits the spanner member S to be canted laterally as much as 10° without rocking the lugs 30 into contact with the periphery of the tubing.

The cylindrically curved flange 26 on the side towards the recessed union element 12 readily telescopes over the end of the union element and thus automatically positions the various lugs 30 at substantially uniform radial spacing from the peripheral surface of the tubing 10. During the torque-applying operation of the union element 12, the spanner member S is stabilized by virtue of the fact that the radial flange 18 abuts the end face 28 of the union element while the cylindrically curved flange 26 simultaneously embraces the outer circumferential surface of the union element.

The extension of handle 16 in the plane of the radial flange 18 is important since the torque exerted on the spanner member in use of the wrench is taken directly by the radial flange. Greater resistance to bending of the spanner member is thereby obtained than if the handle were joined to the unreinforced portion of the cylindrical flange 26.

When the spanner member S is moved axially away from the union element 12, the inner radial flange 18 serves as a guide or guard to minimize the likelihood of any of the spanner lugs 30 making damaging contact with the surface of the tubing 10. If the spanner member is inadvertantly dropped or moved erratically at this time against the surface of the tubing T, no sharp edge of the spanner member is in position to strike the tubing surface. It is highly unlikely that a craftsman using only ordinary care would cant the spanner member to such degrees to bring any of the lugs 30 into damaging position and such an extensive portion of the inner edge 20 of the radial flange 18 makes contact with the tubing surface as to preclude any possibility of the tubing surface being dented, scored, or otherwise damaged. In the withdrawal of the spanner member S laterally out of position straddling the tubing T, the inner radial rib 20 again serves as a guide or guard to keep the lugs 30 from scraping against the surface of the tubing.

The second embodiment of the invention shown in Figures 5, 6, and 7 is largely similar to the first embodiment, as indicated by the use of corresponding numerals to indicate corresponding parts.

The major difference in configuration is that the two integral cylindrically curved flanges 26a are of greater axial dimension than the corresponding flanges 26 of the first embodiment. As may be seen in Figure 7, cylindrically curved flanges 26a extend axially substantially beyond the outer edges of the spanner lugs 30a. The increase in the axial dimension of the cylindrically curved flanges 26a is advantageous in increasing the proportion of the union element 12 that is embraced by a cylindrically curved flange. This greater axial dimension, of course, increases the stability of the spanner during a torque-applying operation. Another difference in configuration is that this second embodiment of the invention has four spanner lugs in each set to match the pattern of recesses in a second type of union assembly.

Figures 5, 6, and 7 illustrate the fact that the lugs 30a may be provided by interlocking separately fabricated lug bodies with the inner radial flange 18. A feature of the invention in this regard is that the lug bodies, each of which is generally designated by numeral 35, are notched to straddle the inner radial flange 18 and the inner radial flange is notched to receive the lug bodies. The inner radial flange 18 has notches 36 of a width to receive the lug bodies 35 with a snug fit and in this instance, the notches 36 extend to approximately half the depth of the radial flange. The lug bodies 35 have notches 38 which fit snugly over the notched portions of the radial flange 18 to permit the lug bodies to abut the two cylindrically curved flanges 26a.

The lug bodies 35 may be heat-bonded in their interlocked positions in any suitable manner, but furnace brazing is preferred. Since the lug bodies 35 fit snugly into the notches 36 of the radial flange 18 in positive abutment against the side surfaces of the notches, the reaction forces involved in the use of the spanner for turning a union element are transmitted directly to the radial flange 18. Thus the bonding material that secures the lug bodies in place is not relied upon to carry the full burden of the reaction forces.

It is also to be noted that the lug bodies 35 straddle the notched portions of the radial flange 18 with such snug fit that the radial flange cooperates directly with the lug bodies to resist any tendency of the lug bodies to twist out of their normal alignment perpendicular with the radial flange. It is apparent, then, that all circumferential forces and axial forces applied to the lug bodies 35 are directly transmitted to the radial flange 18 and that all radially outward forces are transmitted directly both to the radial flange and to the adjacent cylindrically curved flanges 26a.

A special advantage of this construction is that it makes possible economy in manufacture and also results in a superior finish. It can be readily appreciated that if the lugs 30a are cast or forged integrally with the inner radial flange 18 and the two cylindrically curved flanges 26a, special care and special processing are required to provide a clean cut configuration at the junctures of the lugs with the flanges as well as at the juncture of the flanges with each other. In contrast, it is a simple matter to machine the flanges 18 and 26 in the regions of their junctures prior to the assembly of the lug bodies 35 to the flanges.

Although the now preferred embodiments of the present invention have been shown and described herein, it is to be understood that the invention is not to be limited thereto, for it is susceptible to changes in form and detail within the scope of the appended claims.

I claim:

1. A spanner wrench for turning a cylindrical union element on tubing, wherein the union element has spanner recesses in one end, said wrench comprising a substantially semi-circular spanner member including a cylindrically curved flange for embracing said union element, a radial flange for seating on said end of the union element and having an inner edge for embracing said tubing, spanner lugs at one side of said radial flange and rigidly joined to both of said flanges, said lugs extending axially from said radial flange and radially inwardly from said cylindrically curved flange, and a radial extension rigidly joined to the outside of said cylindrically curved flange for applying a torque to the spanner member, said extension extending radially outwardly from said cylindrically curved flange in the plane of said radial flange.

2. A spanner wrench for turning a cylindrical union element on tubing, wherein the union element has spanner recesses in one end, said wrench comprising a substantially semi-circular spanner member including a cylindrically curved flange for embracing said union element, a radial flange for seating on said end of the union element and having an inner edge for embracing said tubing, spanner lugs at one side of said radial flange and rigidly joined to both of said flanges, said lugs extending axially from said radial flange and radially inwardly from said cylindrically curved flange, said radial flange having circumferentially spaced notches in its inner edge, said lugs comprising separately fabricated bodies bonded to both of said flanges and having portions tightly seated in said notches.

3. A spanner wrench for turning a cylindrical union element on tubing, wherein the union element has spanner recesses in one end, said wrench comprising a substantially semi-circular spanner member including a cylindrically curved flange for embracing said union element, a radial flange for seating on said end of the union element and having an inner edge for embracing said tubing, said cylindrically curved flange extending to opposite sides of said radial flange, said radial flange having a plurality of circumferentially spaced notches in its inner edge, a plurality of spanner lugs equal in number to said notches and each comprising a separately fabricated lug body rigidly joined to both of said flanges and extending axially beyond opposite sides of said radial flange and radially inward from said cylindrically curved flange, each lug body being notched for straddling said radial flange and having a portion seating in one of said notches.

References Cited in the file of this patent

UNITED STATES PATENTS

| | | |
|---|---|---|
| 1,470,528 | Flentjen | Oct. 9, 1923 |
| 2,263,564 | Boynton | Nov. 25, 1941 |
| 2,270,092 | Thompson | Jan. 13, 1942 |
| 2,372,269 | Golan | Mar. 27, 1945 |

FOREIGN PATENTS

| | | |
|---|---|---|
| 18,038 | Great Britain | 1900 |
| 844,174 | France | Apr. 17, 1939 |